(12) United States Patent
Sung et al.

(10) Patent No.: US 12,042,030 B2
(45) Date of Patent: Jul. 23, 2024

(54) ENERGY HARVESTING APPARATUS USING ELECTROMAGNETIC INDUCTION AND SMART CANE

(71) Applicant: HUJECT, Seoul (KR)

(72) Inventors: Tae-Hyun Sung, Seoul (KR); Sang Bum Woo, Seoul (KR); Kyung Bum Kim, Seoul (KR); Quan Wang, Seoul (KR); Moses Sung, Seoul (KR)

(73) Assignee: HUJECT, Seoul (KR)

( * ) Notice: Subject to any disclaimer, the term of this patent is extended or adjusted under 35 U.S.C. 154(b) by 528 days.

(21) Appl. No.: 17/237,870

(22) Filed: Apr. 22, 2021

(65) Prior Publication Data

US 2021/0336481 A1 Oct. 28, 2021

(30) Foreign Application Priority Data

Apr. 24, 2020 (KR) .................. 10-2020-0050024
Nov. 10, 2020 (KR) .................. 10-2020-0149474

(51) Int. Cl.
*A45B 3/00* (2006.01)
*A45B 9/00* (2006.01)
*A61H 3/06* (2006.01)
*H02J 50/00* (2016.01)
*H02J 50/10* (2016.01)

(52) U.S. Cl.
CPC .................. *A45B 3/00* (2013.01); *A45B 9/00* (2013.01); *A61H 3/068* (2013.01); *H02J 50/001* (2020.01); *H02J 50/005* (2020.01); *H02J 50/10* (2016.02); *A45B 2009/002* (2013.01); *A45B 2009/007* (2013.01)

(58) Field of Classification Search
CPC ........ H02K 35/02; H02N 2/186; A61H 3/061; A61H 3/068; A61H 2003/063; A45B 2009/007; A45B 9/00
USPC .................................................... 310/15, 30
See application file for complete search history.

(56) References Cited

U.S. PATENT DOCUMENTS

| | | | | |
|---|---|---|---|---|
| 3,670,223 | A * | 6/1972 | Pommeret .............. | H02K 33/08 310/19 |
| 4,228,373 | A * | 10/1980 | Funderburg ........... | H02K 7/065 310/20 |
| 6,897,573 | B1 * | 5/2005 | Shah ...................... | H02K 35/02 290/43 |

(Continued)

FOREIGN PATENT DOCUMENTS

| CN | 104546389 A | 4/2015 |
|---|---|---|
| CN | 104824941 A | 8/2015 |

(Continued)

OTHER PUBLICATIONS 8 page PDF of machine translation of KR 10-20100042352 (cite 6 on Apr. 22, 21 IDS). (Year: 2010).*

(Continued)

*Primary Examiner* — Robert Canfield

(57) ABSTRACT

A smart cane may include: a main body configured to have an adjustable length; an inertia sensor unit configured to generate an angle value between a ground surface and the smart cane or detect an impact on the main body; and a controller configured to adjust the length of the main body according to at least one of the angle value and a number of impacts on the main body.

11 Claims, 6 Drawing Sheets

(56) References Cited

U.S. PATENT DOCUMENTS

| | | | |
|---|---|---|---|
| 7,936,097 B2* | 5/2011 | Essex | F03H 99/00 |
| | | | 310/90.5 |
| 8,704,387 B2* | 4/2014 | Lemieux | F03G 7/08 |
| | | | 290/1 R |
| 9,044,374 B1* | 6/2015 | Stimpson | A61H 3/061 |
| 2006/0066154 A1* | 3/2006 | Ogino | H02K 33/16 |
| | | | 310/15 |
| 2009/0121494 A1* | 5/2009 | Lemieux | H02K 35/02 |
| | | | 290/1 R |
| 2010/0277012 A1* | 11/2010 | Kobayashi | H02K 7/1884 |
| | | | 310/30 |
| 2011/0193427 A1* | 8/2011 | Lemieux | F03G 7/08 |
| | | | 310/25 |
| 2012/0104877 A1* | 5/2012 | Isaacs | H02K 35/02 |
| | | | 310/30 |
| 2013/0214619 A1* | 8/2013 | Nair | H10N 35/101 |
| | | | 310/17 |
| 2015/0214823 A1* | 7/2015 | Shastry | H02J 7/32 |
| | | | 310/30 |
| 2017/0049180 A1* | 2/2017 | Lee | A43B 3/38 |
| 2019/0155404 A1* | 5/2019 | Cutrell | A61F 4/00 |
| 2020/0043368 A1* | 2/2020 | Brathwaite | H04W 4/20 |
| 2020/0230016 A1* | 7/2020 | Ramos | A61H 3/068 |
| 2021/0128394 A1* | 5/2021 | Roman | A61H 3/061 |
| 2021/0236378 A1* | 8/2021 | Petersen | A61H 3/061 |
| 2021/0313861 A1* | 10/2021 | Taylor | H02K 35/04 |
| 2022/0087890 A1* | 3/2022 | Rachel | A61H 3/061 |
| 2022/0305639 A1* | 9/2022 | McManis | B25J 19/023 |
| 2022/0406220 A1* | 12/2022 | Bloomfield | G08B 3/10 |
| 2023/0054910 A1* | 2/2023 | Epstein | A45B 9/00 |
| 2023/0318403 A1* | 10/2023 | Hurry | F03G 7/081 |
| | | | 310/20 |
| 2023/0337791 A1* | 10/2023 | Desai | A61B 5/6887 |

FOREIGN PATENT DOCUMENTS

| | | | | |
|---|---|---|---|---|
| CN | 206976114 U | 2/2018 | | |
| CN | 209059895 U | 7/2019 | | |
| JP | 01164256 A | * 6/1989 | | H02K 35/02 |
| JP | 2006-296144 A | 10/2006 | | |
| JP | 2011-147276 A | 7/2011 | | |
| JP | 2016-044221 A | 4/2016 | | |
| JP | 2018-026936 A | 2/2018 | | |
| JP | 2018-513712 A | 5/2018 | | |
| JP | 6617235 B1 | 11/2019 | | |
| KR | 10-2011-0030276 A | 3/2011 | | |
| KR | 20-2012-0006841 A | 10/2012 | | |
| KR | 10-1610590 B | 4/2016 | | |
| KR | 10-1654299 B | 9/2016 | | |
| KR | 10-1692215 B | 1/2017 | | |
| KR | 10-2017-0086629 A | 7/2017 | | |
| KR | 10-2018-0093752 A | 8/2018 | | |
| KR | 10-1988424 B | 6/2019 | | |
| KR | 10-2020-0072365 A | 6/2020 | | |
| WO | 2019187035 A1 | 10/2019 | | |

OTHER PUBLICATIONS 17 page PDF of machine translation of KR 10-1988424 (cite 4 on the IDS of Apr. 22, 21). (Year: 2019).*

26 page PDF of machine translation of Jp 2011-147276A (cite 6 on Oct. 12, 23 IDS). (Year: 2011).*

13 page PDF of machine translation of JP 2006-296144 (cite 5 on the Oct. 12, 23 IDS). (Year: 2006).*

8 page PDF of Cn 104824941A (cite 2 on the Oct. 12, 23 IDS). (Year: 2015).*

19 page PDF of machine translation of KR 1020180093752 (cite 13 on the Oct. 12, 23 IDS) (Year: 2018).*

21 page PDF of machine translation of WO 2019/187035 (cite9 of the Oct. 12, 23 IDS). (Year: 2019).*

* cited by examiner

ENERGY HARVESTING APPARATUS USING ELECTROMAGNETIC INDUCTION AND SMART CANE

CROSS-REFERENCE TO RELATED APPLICATIONS

This application claims priority under 35 U.S.C 119(a) to Korean Patent Application No. 10-2020-0050024, filed with the Korean Intellectual Property Office on Apr. 24, 2020, and Korean Patent Application No. 10-2020-0149474, filed with the Korean Intellectual Property Office on Nov. 10, 2020 the disclosures of which are incorporated herein by reference in their entirety.

BACKGROUND

1. Technical Field

The present disclosure relates to an energy harvesting apparatus using electromagnetic induction and a smart cane using the same.

2. Description of the Related Art

A visually impaired person uses a cane to detect obstacles located on the person's path of movement. However, since there is a limit to how much a typical cane can help a visually impaired person walk the streets and cross roads in the manner of a non-impaired person, development is under way of canes installed with functions that are assist and support walking by the visually impaired. The cane for visually impaired persons is being combined with IT techniques to evolve into the smart cane, and there is also research conducted on the smart cane installed with an energy harvester.

Energy harvesting refers to the technology of collecting energy that is discarded in everyday life in forms such as vibrations, light, heat, electromagnetic waves, etc., and converting this energy into electrical energy. Research on energy harvesting is being conducted in a wide variety of fields.

In particular, the energy harvesting apparatus based on electromagnetic induction is being applied in various products, as it utilizes a simple principle and is easy to implement.

SUMMARY OF THE INVENTION

An aspect of the disclosure is to provide a smart cane for the visually impaired.

Another aspect of the disclosure is to provide a smart cane that can be automatically adjusted in length.

Yet another aspect of the disclosure is to provide a smart cane that can provide various functions through voice recognition.

Still another aspect of the disclosure is to provide an energy harvesting apparatus of which the wound length of the coils can be adjusted.

An embodiment of the disclosure, conceived to achieve the objectives above, provides a smart cane that includes: a main body configured to have an adjustable length; an inertia sensor unit configured to generate an angle value between a ground surface and the smart cane or detect an impact on the main body; and a controller configured to adjust the length of the main body according to at least one of the angle value and a number of impacts on the main body.

Another embodiment of the disclosure, conceived to achieve the objectives above, provides an energy harvesting apparatus using electromagnetic induction that includes: a frame having a cylindrical shape; a first and a second movable wall having annular shapes and configured to move along a perimeter of the frame while contacting the perimeter; and a coil wound around the perimeter between the first and second movable walls.

Still another embodiment of the disclosure, conceived to achieve the objectives above, provides an energy harvesting apparatus using electromagnetic induction that includes: a frame having a cylindrical shape; a fixed wall having an annular shape and fixed at a perimeter of the frame; a movable wall having an annular shape and configured to move along the perimeter of the frame while contacting the perimeter; and a coil wound around the perimeter between the fixed wall and the movable wall.

An embodiment of the disclosure makes it possible to adjust the length of the cane to be suitable for the height of the user, thereby reducing the inconvenience associated with the use of the cane.

Also, an embodiment of the disclosure can utilize a voice recognition function for the visually impaired, to thereby increase user convenience for the visually impaired person.

Also, an embodiment of the disclosure can adjust the wound length of the coil wound between movable walls by adjusting the distance between the movable walls.

Also, an embodiment of the disclosure makes it possible to increase the amount of electricity generated by an energy harvesting apparatus by allowing an adjustment of the wound length of the coil according to the user and place of use of the energy harvesting apparatus.

Additional aspects and advantages of the present disclosure will be set forth in part in the description which follows, and in part will be obvious from the description, or may be learned by practice of the disclosure.

DETAILED DESCRIPTION OF THE INVENTION

Figure 1:
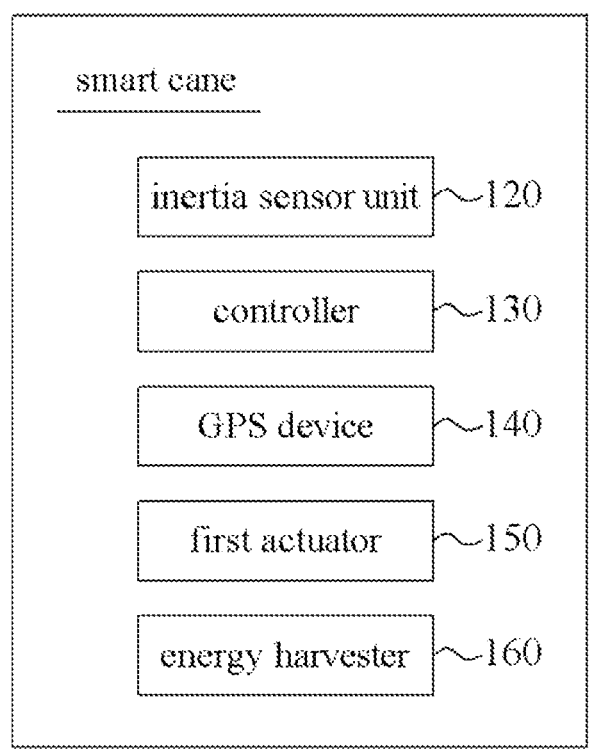
FIG. 1 is a block diagram illustrating a smart cane according to an embodiment of the disclosure.

As the invention allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In describing each figure, like reference numerals are used to represent like elements.

A detailed description of certain embodiments of the invention is provided below with reference to the accompanying drawings.

Figure 2:
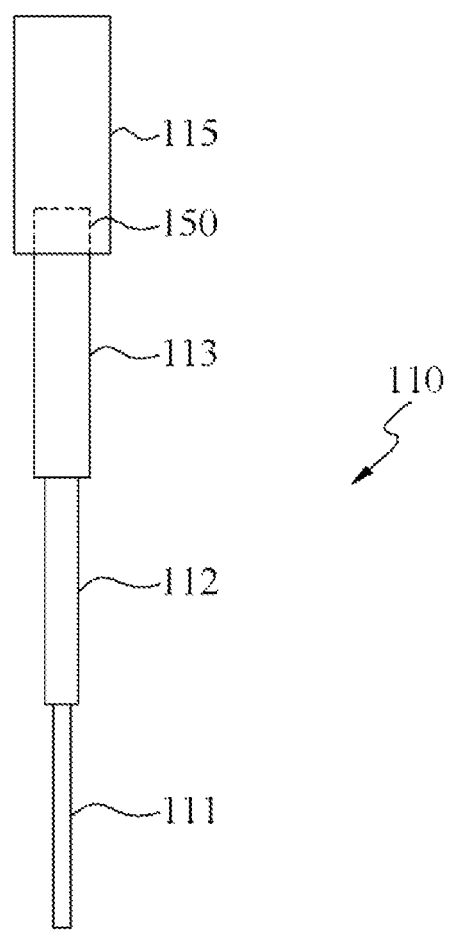
FIG. 2 is a diagram illustrating a smart cane according to an embodiment of the disclosure.

FIG. 1 is a block diagram illustrating a smart cane according to an embodiment of the disclosure, and FIG. 2 is a diagram illustrating a smart cane according to an embodiment of the disclosure.

Referring to FIG. 1 and FIG. 2, a smart cane according to an embodiment of the disclosure may include a main body 110, an inertia sensor unit 120, and a controller 130. Depending on the embodiment, the smart cane can further include a GPS device 140, a first actuator 150, an energy harvester 160, and other components (not illustrated in FIG. 1).

The main body 110 may be shaped as a rod, with one end of the main body contacting the ground surface and the other end of the main body coupled with a handle 115 for the user. The user may hold the smart cane by the handle 115 and sway the smart cane to detect nearby obstacles.

The length of the main body 110 can be adjusted, and the main body 110 can be designed in various forms that allow an adjusting of the length. In one example, the main body 110 can include cylindrical rods 111 to 113 of different diameters, where the cylindrical rods of relatively smaller diameters can be inserted inside the cylindrical rods of relatively larger diameters. The extent to which these are inserted can be adjusted by the first actuator 150, and the length of the main body 110 can be adjusted by the extent of the insertions. In another example, the length of the main body 110 can be adjusted by having the user pull out the cylindrical rods of smaller diameters from the cylindrical rods of larger diameters and then fixing the cylindrical rods by rotating the cylindrical rods.

The inertia sensor unit 120 may sense the inclination of the smart cane and, in one example, can generate an angle value between the ground surface and the smart cane. Also, the inertia sensor unit 120 can detect an impact on the main body 110 applied by the ground surface or an obstacle. The inertia sensor unit 120 can include various inertia sensors such as angular velocity sensors, acceleration sensors, magnetometers, etc., for example, and can be mounted within the main body 110 or the handle.

The controller 130 may adjust the length of the main body 110 according to at least one of the inclination and the number of impacts on the main body 110 detected by the inertia sensor unit 120 or according to a request by the user, and the inertia sensor unit 120 can be mounted on the handle 115.

If the length of a cane is not suitable with respect to the height of the visually impaired person, the person would have to lean forward, creating a larger load on the lower back. Also, since the visually impaired person detects nearby obstacles by repeatedly hitting the cane on the ground surface, the end of the cane may undergo wear, and the length of the cane would shorten with use, so that the shortened length of the cane may also result in the visually impaired person having to lean forward.

An embodiment of the disclosure can resolve the inconvenience associated with the length of the smart cane being unsuitable with respect to the height of the user or with the length of the smart cane becoming shortened by enabling the user, i.e. a visually impaired person, to adjust the length of the main body 110 to be suitable for the user's height or by adjusting the length of the main body 110 according to the smart cane's inclination, which may change as the smart cane is shortened.

The controller 130 can, for example, adjust the length of the main body 110 according to the angle value generated at the inertia sensor unit 120 and can transmit a control signal for increasing or decreasing the length of the main body 110 to the first actuator 150 configured to adjust the length of the main body 110.

Since the angle value between the ground surface and the smart cane increases with a decrease in the length of the smart cane, the controller 130 can increase the length of the main body 110 when the angle value is greater than or equal to a first reference value. The first reference value can be a value set by the user to be suitable for the height of the user and can be set while the smart cane is in contact with the ground surface.

As the angle value changes continuously while the smart cane is being shaken by the user during use, the controller 130 can increase the length of the main body 110 if the angle value at a point where there is an impact by the main body 110 against the ground surface is greater than or equal to a first reference value. An impact by the main body 110 against the ground surface can be detected by the inertia sensor unit 120.

The controller 130 can adjust the length of the main body 110 according to the difference between the first reference value and the angle value, for example by increasing the length of the main body 110 in proportion to the difference between the first reference value and the angle vale. That is, a greater difference between the first reference value and the angle value would mean that the smart cane has been shortened by a greater extent, and as such the displacement by which the main body 110 is lengthened may also be increased.

Alternatively, the controller 130 can count the number of impacts on the main body 110 and can increase the length of the main body 110 by a preset amount if the number of impacts is greater than or equal to a first threshold value. Since the length of the main body 110 would be increasingly shortened as the main body 110 experiences an increased number of impacts, the controller 130 can determine that the length of the main body 110 has been shortened considerably when the number of impacts reaches or exceeds a first threshold value and can increase the length of the main body 110 by a preset amount. In another example, the controller 130 can adjust the length of the main body 110 according to the angle value when the number of impacts is greater than or equal to a first threshold value.

In one example, the controller 130 can increase the length of the main body 110 based on a count of the number of impacts on the main body 110 while the smart cane is located outdoors, using the GPS signal reception rate of the GPS device 140 to determine whether or not the smart cane is located outdoors.

The controller 130 can reset the counted number of impacts when the length of the main body 110 is increased by a preset amount and, when the number of impacts after the resetting again reaches or exceeds the first threshold value, can increase the length of the main body 110 by a preset amount.

An embodiment of the disclosure can further increase convenience for the user by automatically reducing the length of the smart cane when the user is located indoors. The controller 130 can determine that the user has entered an indoor space and decrease the length of the main body 110, if the GPS signal reception rate of the GPS device 140 receiving a GPS signal is lower than or equal to a second threshold value.

However, since the user may still use the cane while indoors, an embodiment of the disclosure may reduce the length of the smart cane when the user is not using the cane indoors. The user may not use the cane indoors while sitting on a chair, etc., in which case the cane may be laid on a table or the floor, etc. Thus, the controller 130 can decrease the length of the main body 110 to a first target length when the GPS signal reception rate is smaller than or equal to a second threshold value and the angle value is smaller than or equal to a second reference value. The first target length may be a length that allows carrying by the user and can be set differently according to user.

While the length of the main body 110 is decreased to a first target length, when the user uses the smart cane and moves within the indoor space, the controller 130 may increase the length of the main body 110 to a second target length greater than the first target length. That is, the controller 130 may increase the length of the main body 110 to the second target length, which is greater than the first target length, when the GPS signal reception rate is smaller than or equal to the second threshold value and the angle value is greater than or equal to the second reference value. The second target length can be the length maintained before the user enters the indoor space or a length slightly smaller than the length maintained before the user enters the indoor space.

The energy harvester 160 may generate electrical power for the smart cane and can be mounted on the handle 115. The energy harvester 160 can be implemented in various forms in different embodiments and can generate electrical power by using a piezoelectric element or by using electromagnetic induction.

Figure 3:
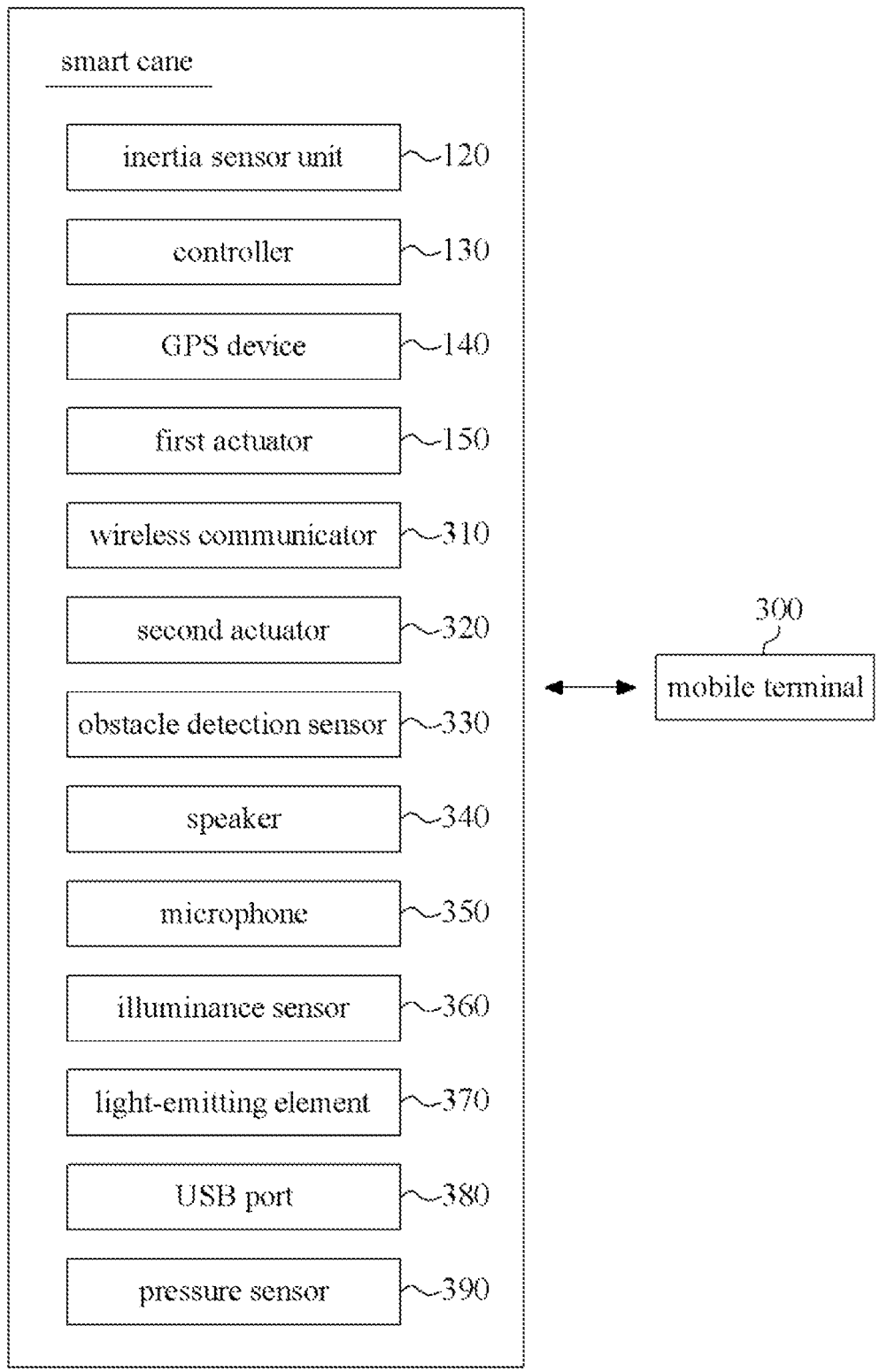
FIG. 3 is a block diagram illustrating a smart cane according to another embodiment of the disclosure.

FIG. 3 is a block diagram illustrating a smart cane according to another embodiment of the disclosure.

Referring to FIG. 3, a smart cane according to another embodiment of the disclosure can further include a wireless communicator 310 and a second actuator 320, and depending on the embodiment, can also further include an obstacle detection sensor 330, a speaker 340, a microphone 350, an illuminance sensor 360, a light-emitting element 370, a USB port 380, a pressure sensor 390, a GPS device 140, etc.

The wireless communicator 310 may transmit and receive data to and from a mobile terminal 300 by using a near-field wireless communication method such as WiFi or Bluetooth. For example, the wireless communicator 310 can receive navigation data from the user's mobile terminal 300. The navigation data can include information on a destination, the current location of the user, a movement path, the distance to the point at which the user's current position and movement direction should be changed, etc.

In addition, the wireless communicator 310 can transmit the destination information of the user to the mobile terminal 300 or request information for guidance towards audible signal generators for the visually impaired near traffic lights. Also, the wireless communicator 310 can transmit the location information of the smart cane to the mobile terminal 300, to support a mode that allows the user to easily find the smart cane, and conversely can receive the location information of the mobile terminal 300 to support a mode that allows the user to easily find the mobile terminal 300 by referencing the location information of the mobile terminal 300 outputted from the smart cane.

The controller 130 can adjust a vibration pattern generated by the second actuator 320 according to the distance between the current location of the user and the point where the movement direction should be changed or adjust the vibration pattern according to the movement direction. For example, the vibration pattern can be a pattern of vibrations following a certain cycle, where the vibration cycle can be shortened as the distance between the current location of the user and the point where the movement direction should be changed is decreased. The second actuator 320 that generates the vibration can be included in the handle 115.

The illuminance sensor 360 may detect the illuminance in the vicinity of the smart cane, and the light-emitting element 370 may emit light depending on the detected illuminance.

The obstacle detection sensor 330 may detect obstacles around the smart cane and can include an ultrasonic sensor, a laser sensor, etc. A vibration can be generated by the second actuator 320 or an alarm can be generated by the speaker 340 if a nearby obstacle is detected or depending on the distance between the smart cane and the obstacle.

Also, the second actuator 320 can generate a vibration or the speaker 340 can generate an alarm if the user drops the smart cane while walking, in order that the visually impaired user may easily find the smart cane. The vibration and alarm can be stopped when the user finds and grips the smart cane, where the pressure sensor 390 attached to the handle 115 can detect a grip by the user.

The USB port 380 may be used for charging the battery of the smart cane. Depending on the embodiment, the battery charge of the mobile terminal 300 can be transferred to the battery of the smart cane or the battery charge of the smart cane can be transferred to the battery of the mobile terminal 300 through the USB port 380.

The microphone 350 may receive input of the user's voice and transfer the input to the controller 130. The controller 130 can recognize the user's voice to generate various control signals. For example, voice recognition can be used by the wireless communicator 310 to transmit the user's destination to the mobile terminal 300 or request guidance information from an audible signal generator. It is also possible to use voice recognition in increasing or reducing the length of the main body 110 and in turning the light-emitting element 370 on or off. It is also possible to use voice recognition in transferring or receiving battery power, where the amount of battery charge remaining at the smart cane can be outputted through the speaker 340.

Figure 4:
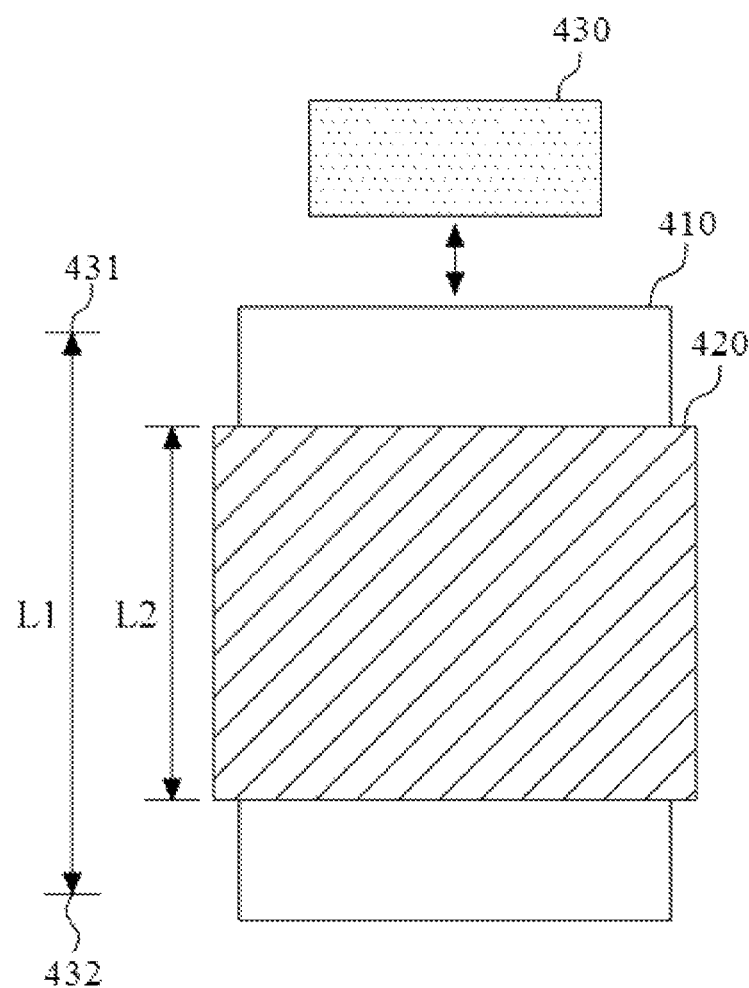
FIG. 4, FIG. 5, and FIG. 6 are diagrams illustrating an energy harvesting apparatus according to an embodiment of the disclosure.
Figure 5:
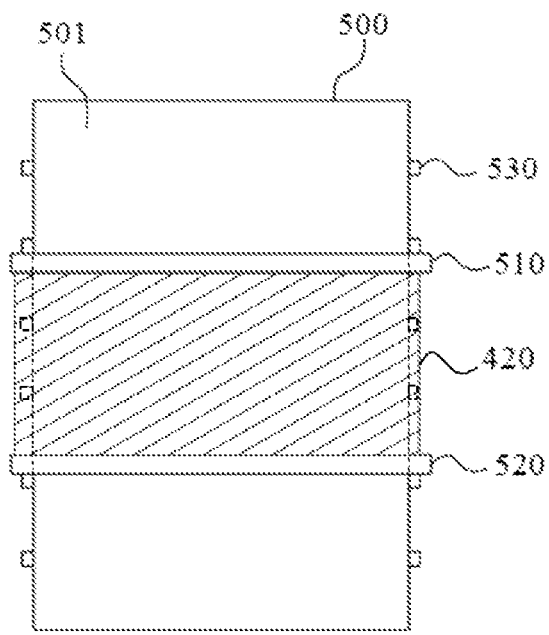
Figure 6:
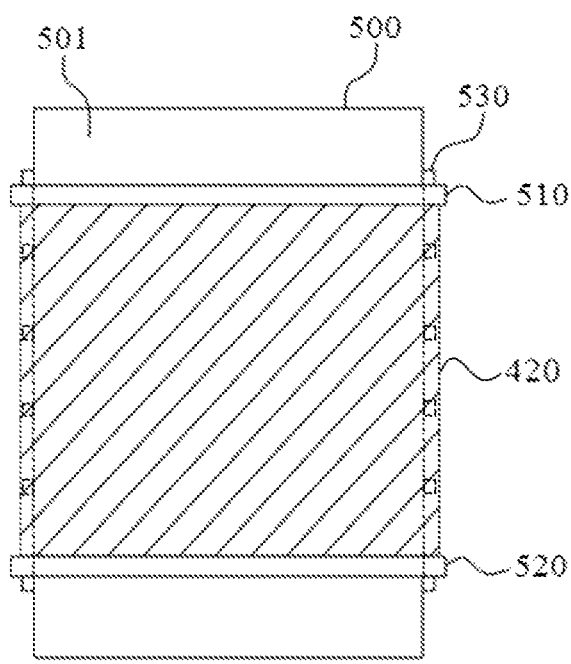

FIGS. 4 to 6 are diagrams illustrating an energy harvesting apparatus according to an embodiment of the disclosure, where FIG. 4 illustrates a typical structure for an energy harvesting apparatus that uses electromagnetic induction, and FIG. 5 and FIG. 6 illustrate an energy harvesting apparatus according to an embodiment of the disclosure.

As illustrated in FIG. 4, an energy harvesting apparatus that uses electromagnetic induction may be structured such that a magnet 430 undergoes an oscillating movement through a hole in a frame 410 around which a coil 420 is wound. Here, in order to generate a greater amount of electrical energy, the wound length L2 of the coil should be longer, the displacement range L1 of the oscillating magnet 430 should be greater than the wound length L2 of the coil, and the positions 431, 432 where the movement direction of the magnet changes should be outside the region where the coil is wound.

Also, the magnet may be designed to be moved by an external force generally applied from the outside, and the magnitude of the external force can be varied depending on the product in which the energy harvesting apparatus is applied or the user using the product, and the displacement range of the magnet can be varied as well.

Therefore, in order to maximize the electrical energy generated under such various environments, there is a need to vary the wound length of the coil according to the place of use and the type of user, and to address this need, the disclosure proposes an energy harvesting apparatus of which the wound length of the coil can be adjusted.

To adjust the wound length of the coil, one embodiment of the disclosure uses a movable wall that can move along the perimeter of the frame around which the coil is wound. An embodiment of the disclosure can adjust the region where the coil can be wound, to thereby adjust the wound length of the coil and also adjust the length of an already wound coil.

An energy harvesting apparatus using electromagnetic induction according to an embodiment of the disclosure can be utilized in various products where energy harvesting is required, such as shoes, smart canes, etc.

Referring to FIG. 5 and FIG. 6, an energy harvesting apparatus according to an embodiment of the disclosure can further include a frame 500, a first movable wall 510, a second movable wall 520, and a coil (not shown), and in different embodiments can further include protrusions 530.

The frame 500 can have a cylindrical shape with a hole formed therein, and a magnet can move through the hole of the frame 500.

The first and second movable walls 510, 520 can move along the perimeter 501 and can be formed in annular shapes to be capable of moving while contacting the frame 500. It may be preferable that the first and second movable walls 510, 520 be capable of moving while maintaining contact with the perimeter 501, because moving while separated from the perimeter 501 of the frame may allow the wound coil to be drawn out through the separated gap.

The first and second movable walls 510, 520 can be moved by external forces applied by the user, etc., and the first and second movable walls 510, 520 can be made of an elastic substance providing a high friction such as a rubber material, for instance, so as to be fixed after being moved on the perimeter 501. Alternatively, certain embodiments can use separate fixing members for fixing the first and second movable walls 510, 520.

The coil may be wound around the perimeter 501 of the frame 500 between the first and second movable walls 510, 520. Thus, according to an embodiment of the disclosure, the wound length of the coil can be adjusted according to the distance between the first and second movable walls 510, 520.

If the first and second movable walls 510, 520 were to be moved from the positions in FIG. 5 to the positions in FIG. 6, the distance between the first and second movable walls 510, 520 would be increased, so that the wound length of the coil may also be increased. For example, if the product in which an energy harvesting apparatus according to an embodiment of the disclosure is used is a smart cane, and if the user of the smart cane is a male, the displacement range of the magnet can be great. Under such a usage environment, even if the wound length of the coil is increased, the displacement range of the magnet can remain greater than the wound length of the coil, and since increasing the wound length of the coil enables the generating of a greater amount of electricity, the distance between the first and second movable walls 510, 520 can be increased as in FIG. 6 to thus increase the wound length of the coil and increase the amount of electricity generated.

Conversely, if the first and second movable walls 510, 520 were to be moved from the positions in FIG. 6 to the positions in FIG. 5, the distance between the first and second movable walls 510, 520 would be decreased, so that the wound length of the coil may also be decreased. For example, if the product in which an energy harvesting apparatus according to an embodiment of the disclosure is used is a smart cane, and if the user of the smart cane is a female, the displacement range of the magnet can be relatively smaller. Under such a usage environment, increasing the wound length of the coil may result in the displacement range of the magnet being smaller than the wound length of the coil, and therefore the distance between the first and second movable walls 510, 520 can be decreased as in FIG. 5, decreasing the wound length of the coil and thereby increasing the amount of electricity generated.

An energy harvesting apparatus according to an embodiment of the disclosure can further include fixing members for fixing the first and second movable walls 510, 520, where O-rings or protrusions 530 can be used as the fixing members.

An O-ring of a rubber material can be coupled to a movable wall 510, 520 and can be positioned between the movable wall 510, 520 and the perimeter 501. A groove can be formed in the movable wall 510, 520 to fix the O-ring to the movable wall 510, 520, where the O-ring can be inserted in the groove of the movable wall 510, 520 to be coupled to the movable wall 510, 520. The O-ring can enable to movable wall 510, 520 to be more firmly fixed to the frame 500 in a tighter contact.

The protrusions 530 can be formed protruding from the perimeter 501 of the frame 500 and can be arranged separated in preset intervals. The protrusions 530 can also be formed in annular shapes, but the shapes, intervals, etc., of the protrusions 530 can vary in different embodiments. Even with the coil wound, the protrusions 530 can prevent the distance between the first and second movable walls 510, 520 from being increased, and the first and second movable walls 510, 520 can be kept fixed.

Also, in order to prevent the first and second movable walls 510, 520 from becoming detached from the frame 500 by the movements of the first and second movable walls 510, 520, an energy harvesting apparatus according to an embodiment of the disclosure can further include annular fixed walls that may be fixed onto the perimeter 501 to prevent separation between the frame 500 and the first and second movable walls 510, 520. The fixed walls can be arranged at one end and the other end of the frame 500.

Thus, according to an embodiment of the disclosure, since it is possible to adjust the wound length of the coil by adjusting the distance between the movable walls, it is also possible to increase the amount of electricity generated in the energy harvesting apparatus by adjusting the would length of the coil according to the user of the energy harvesting apparatus and the place of use.

Figure 7:
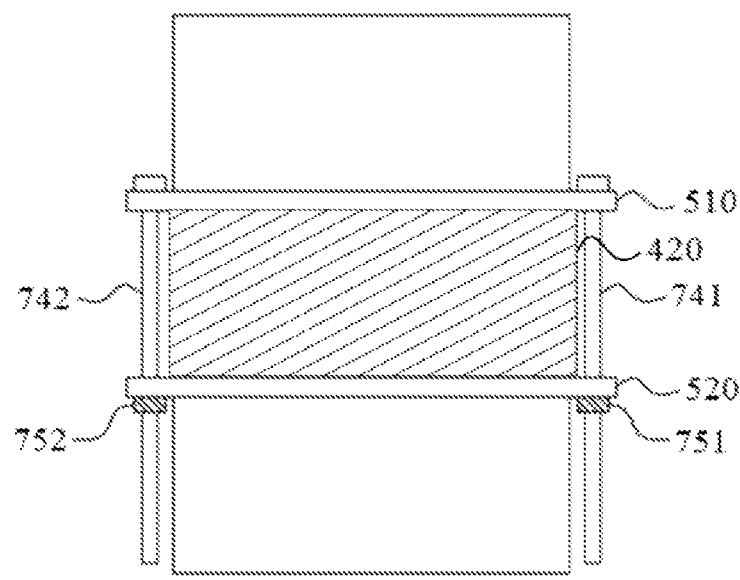
FIG. 7 is a diagram illustrating an energy harvesting apparatus using electromagnetic induction according to another embodiment of the disclosure.

FIG. 7 is a diagram illustrating an energy harvesting apparatus using electromagnetic induction according to another embodiment of the disclosure.

Referring to FIG. 7, an energy harvesting apparatus according to an embodiment of the disclosure can further include rods 741, 742, nuts 751, 752, and a spring (not shown) as well as the frame, movable walls 510, 520, and coil. The numbers of rods and nuts can vary in different embodiments.

The rods 741, 742 may be coupled to holes formed in the first and second movable walls 510, 520 and may have threads formed therein. To prevent a rod 741, 742 from being separated from the first and second movable walls 510, 520, the diameter at one end of the rod 741, 742 can be greater than the diameters of the holes in the first and second movable walls 510, 520.

The nuts 751, 752 may be coupled to the rods 741, 742, and the spring may be fitted onto the frame 500 to be positioned between the first and second movable walls 510, 520. The spring may push the first and second movable walls 510, 520 in opposite directions from between the first and second movable walls 510, 520.

The separated distance between the first and second movable walls 510, 520 can be adjusted according to the rotation directions of the nuts 751, 752. For instance, when the nuts 751, 752 are rotated in a clockwise direction, the distance between the first and second movable walls 510, 520 can be decreased, whereas when the nuts 751, 752 are rotated in a counterclockwise direction, the distance between the first and second movable walls 510, 520 can be increased, as the first and second movable walls 510, 520 are pushed by the spring.

According to an embodiment of the disclosure, it is possible to adjust the wound length of the coil, even after the coil is wound between the first and second movable walls 510, 520, by adjusting the distance between the first and second movable walls 510, 520. As the number of times a typical coil is wound may generally be as little as several tens and as much as several thousands, a relatively large part of the coil may be wound around the central portion and a relatively small part of the coil may be wound around the edge portions. When the distance between the first and second movable walls is decreased while the coil is in a wound state, the coil may be pushed to the central portion and the wound length of the coil may be shortened. Also, when the distance between the first and second movable walls is increased, the coil may be dispersed to the edge portions and the wound length of the coil may be lengthened.

Thus, according to an embodiment of the disclosure, it is possible to easily adjust the wound length of the coil even when the coil is already wound.

Figure 8:
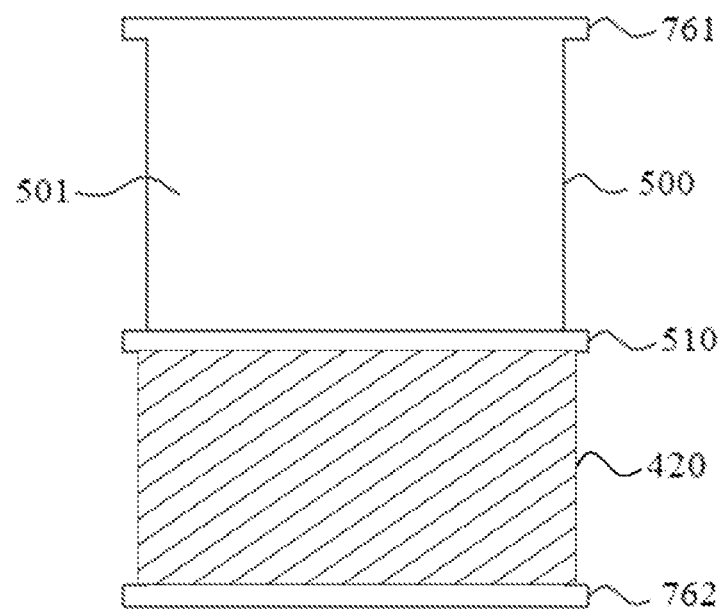
FIG. 8 is a diagram illustrating an energy harvesting apparatus using electromagnetic induction according to another embodiment of the disclosure.

FIG. 8 is a diagram illustrating an energy harvesting apparatus using electromagnetic induction according to another embodiment of the disclosure.

Referring to FIG. 8, an energy harvesting apparatus according to an embodiment of the disclosure may include a frame 500, fixed walls 761, 762, a movable wall 510, and a coil (not shown). Unlike the embodiment described above, the embodiment shown in FIG. 8 may utilize a single movable wall.

The fixed walls 761, 762 may be fixed at the perimeter of the frame and can be formed at one end and the other end of the frame 500. The fixed walls 761, 762 can be formed extending from the frame 500 and can have annular shapes corresponding to the cylindrical form of the frame 500.

The movable wall 510 can move along the perimeter 501 while maintaining contact with the perimeter 501 of the frame and can have an annular shape.

The coil may be wound around the perimeter 501 of the frame between one of the fixed walls 761, 762 positioned at the one end and other end of the frame 500 and the movable wall 510.

Depending on the embodiment, the fixing member described above can further be included, and similarly the rod, nut, and spring can further be included. Here, a rod may be coupled to one of the fixed walls 761, 762 positioned at the one end and other end and to a hole in the movable wall, and the spring, placed between the fixed wall and the movable wall to which the rod is coupled, may push the movable wall in a direction away from the fixed wall.

While the present disclosure is described above by way of limited embodiments and drawings that refer to particular details such as specific elements, etc., these are provided only to aid the general understanding of the present invention. The present invention is not to be limited by the embodiments above, and the person having ordinary skill in the field of art to which the present invention pertains would be able to derive numerous modifications and variations from the descriptions and drawings above. Therefore, it should be appreciated that the spirit of the present invention is not limited to the embodiments described above. Rather, the concepts set forth in the appended scope of claims as well as their equivalents and variations are encompassed within the spirit of the present invention.

What is claimed is:

1. A smart cane comprising:
a main body configured to have an adjustable length;
an inertia sensor unit configured to generate an angle value between a ground surface and the smart cane or to detect an impact on the main body; and
a controller configured to adjust the length of the main body according to at least one of the angle value and a number of impacts on the main body.

2. The smart cane of claim 1, wherein the controller increases the length of the main body if the angle value is greater than or equal to a first reference value at a time point at which the impact is detected.

3. The smart cane of claim 2, wherein the controller increases the length of the main body in proportion to a difference between the first reference value set by a user and the angle value.

4. The smart cane of claim 1, wherein the controller counts a number of impacts on the main body and, if the number of impacts is greater than or equal to a first threshold value, adjusts the length of the main body according to the angle value.

5. The smart cane of claim 1, wherein the controller counts a number of impacts on the main body and, if the number of impacts is greater than or equal to a first threshold value, increases the length of the main body by a preset amount.

6. The smart cane of claim 1, further comprising a GPS device configured to receive a GPS signal,
wherein the controller decreases the length of the main body if a user enters an indoor space so that a reception rate of the GPS signal is smaller than or equal to a second threshold value and if the angle value is smaller than or equal to a second reference value.

7. The smart cane of claim 6, wherein, if the reception rate of the GPS signal is smaller than or equal to the second threshold value and if the angle value is smaller than or equal to the second reference value, the controller decreases the length of the main body to a first target length, and
while the main body is in a state of having the length reduced to the first target length, if the reception rate of the GPS signal is smaller than or equal to the second threshold value and if the angle value is greater than the second reference value, the controller increases the length of the main body to a second target length longer than the first target length.

8. The smart cane of claim 1, further comprising:
a wireless communicator configured to receive navigation data from a mobile terminal of a user; and
an actuator configured to generate a vibration, wherein the controller adjusts a pattern of the vibration generated by the actuator according to a distance between a current location of the user and a point where a movement direction is to be changed.

9. The smart cane of claim 1, further comprising an energy harvester using a piezoelectric element or electromagnetic induction.

10. The smart cane of claim 9, wherein the energy harvester comprises:
a frame having a cylindrical shape;
a first movable wall and a second movable wall having annular shapes and configured to move along a perimeter of the frame while contacting the perimeter; and
a coil wound around the perimeter between the first and second movable walls.

11. The smart cane of claim 9, wherein the energy harvester comprises:
a frame having a cylindrical shape;
a fixed wall having an annular shape and fixed at a perimeter of the frame;
a movable wall having an annular shape and configured to move along the perimeter of the frame while contacting the perimeter; and
a coil wound around the perimeter between the fixed wall and the movable wall.

* * * * *